United States Patent [19]
Balmer

[11] Patent Number: 5,591,420
[45] Date of Patent: Jan. 7, 1997

[54] CESIUM TITANIUM SILICATE AND METHOD OF MAKING

[75] Inventor: Mari L. Balmer, West Richland, Wash.

[73] Assignee: Battelle Memorial Institute, Richland, Wash.

[21] Appl. No.: 519,322

[22] Filed: Aug. 25, 1995

[51] Int. Cl.$^6$ .......................... C01B 33/32; C01B 39/06; B09B 3/00
[52] U.S. Cl. .......................... 423/700; 423/713; 501/134; 501/154; 501/155; 588/10; 588/14; 588/901
[58] Field of Search ...................... 423/700, 713; 501/5, 134, 154, 155; 588/10, 14, 15, 252, 901

[56] References Cited

U.S. PATENT DOCUMENTS

| | | | |
|---|---|---|---|
| 3,959,172 | 5/1976 | Brownell et al. | 588/14 |
| 4,274,976 | 6/1981 | Ringwood | 588/15 |
| 4,309,313 | 1/1982 | Barrett et al. | 423/700 |
| 4,430,256 | 2/1984 | Rustum | 588/10 |
| 4,430,257 | 2/1984 | Pope et al. | 588/12 |
| 4,737,316 | 4/1988 | Mecedo et al. | 588/9 |
| 5,272,740 | 12/1993 | Marsaud et al. | 588/2 |
| 5,494,863 | 2/1996 | Mathur | 588/10 |

OTHER PUBLICATIONS

De et al. "Development of Glass Ceramics For The Incorporation of Fission Products" *Am. Cer. Soc. Bul.* vol. 5 No. 5 (1976) pp. 500–503.

Y. Inoue, H. Yamazaki, and R. Erza (Department of Nuclear Engineering, Faculty of Engineering, Tohoku University, Aramaki, Aoba–ku, Sendai, 980 Japan); "Fundamental Study on the Solidification of Cs$^+$ and Sr$^{2+}$ with Hydrous Ti$^{IV}$ Oxide Modified with Si and Zr"; MRS 1992; 6 pages (no month), E. R. Vance, B. E. Scheetz, M. W. Barnes, and B. J. Bodnar (Materials Research Laboratory, The Pennsylvania State University); "Studies of Pollucite"; The Scientific Basis for Nuclear Waste Management –*Elsevier Science Publishing Company, Inc.;* 1982; pp. 31–35 (no month).

Kazumichi Yanagisawa, Mamoru Nishioka, and Nakamichi Yamasaki (Research Laboratory of Hydrothermal Chemistry, Faculty of Science, Kochi University*) "Immobilization of Cesium into Pollucite Structure by Hydrothermal Hot–Pressing"; *Journal of Nuclear Science and Technology*, 24[1], pp. 51–60; Jan. 1987. *Akebono–cho, Kochi–shi 780).

Primary Examiner—Mark L. Bell
Assistant Examiner—David Sample
Attorney, Agent, or Firm—Paul W. Zimmerman

[57] ABSTRACT

The invention is the new material, a ternary compound of cesium, silica, and titania, together with a method of making the ternary compound, cesium titanium silicate pollucite. More specifically, the invention is $Cs_2Ti_2Si_4O_{13}$ pollucite which is a new crystalline phase representing a novel class of Ti-containing zeolites. Compositions contain relatively high $Cs_2O$ and $TiO_2$ loadings and are durable glass and ceramic materials. The amount of $TiO_2$ and $Cs_2$ that can be incorporated into these glasses and crystalline ceramics far exceeds the limits set for the borosilicate high level waste glass.

23 Claims, 8 Drawing Sheets

CESIUM TITANIUM SILICATE AND METHOD OF MAKING

This invention was made with Government support under Contract DE-AC06-76RLO 1830 awarded by the U.S. Department of Energy. The Government has certain rights in the invention.

FIELD OF THE INVENTION

The present invention relates generally to a cesium titanium silicate ceramic, more specifically a particular cesium titanium silicate ceramic having a zeolitic structure heavily loaded with titanium and highly leach resistant. The present invention further relates to a method of making the cesium titanium silicate.

BACKGROUND OF THE INVENTION

In a continuing search to find methods to contain radioactive high level waste which is a mixture of fission products, fuel components, non-radioactive chemicals, and other radioactive materials, several options have been proposed. When cesium is present, waste forms of borosilicate glass, Synroc, ceramics and concrete exhibit difficulties in processing or high leach rate because of the high solubility of cesium (Immobilization of Cesium into Pollucite Structure by Hydrothermal Hot-Pressing, Yanagisawa et al, Journal of Nuclear Science and Technology, 24[1], pp. 51–60, January 1987). The current optimal melting temperature of borosilicate glass is high, 1150° C. which requires substantial heat energy to achieve. Further, waste forms are generally limited in the amount of cesium that can be contained. Yanagisawa et al. further point out that pollucite ($CsAlSi_2O_6$) is one of the more stable phases for cesium immobilization.

Pollucite ($CsAlSi_2O_6$) is known to be one of the best materials for Cs containment, exhibiting aqueous leach rates as low as $5.7 \times 10^{-8}$ gcm$^{-2}$day$^{-1}$ as reported by S. Komareni, G. J. McCarthy, and S. A. Gallagher, "Cation Exchange Behavior of Synthetic Cesium Aluminosilicates," *Inorg. Nucl. Chem. Letters*, Vol. 14, pp. 173–177, 1978. In the paper, Studies of Pollucite, Vance et al., The Scientific Basis for Nuclear Waste Management, Elsevier 1992, substitution of cations other than aluminum is discussed. Specifically mentioned are $Fe^{3+}$, Mn Co Ni or Cr. However, no pollucite phase was observed for Cr. Vance et al. further report that rare earths and uranium may not enter the alkali site. Vance et al. make no statement with respect to any other elements.

In the paper, Fundamental Study on the Solidification of $Cs^+$ and $Sr^{2+}$ With Hydrous $Ti^{IV}$ Oxide Modified With Si and Zr, Inoue et al., Materials Research Society, 1992, the potential use of $Ti^{IV}$-Si oxide for the solidification of radioactive $Cs^+$. More specifically, Inoue et al. used the protonated silicotitanate $Ti_{0.52}Si_{0.48} \cdot 2.09H_2O$, $H^+$ to form. They exchanged for $Cs^+$ at three loadings, heat treated at 900° C. and obtained the compositions set forth in Table A. The compositions are further shown in a phase diagram of cesium titanium silicate in FIG. 1 as region 10. Inoue et al. report that the dissolution rate of $Cs^+$ to from these materials becomes very slow after 80 hours of contact, but no equilibrium is reached within 40 days. They further conclude that the cesium titanium silicate is considered a promising material for the solidification of cesium. None of the material phases were identified.

TABLE A

| Compositions of Inoue et al., (mole %) | | | |
|---|---|---|---|
| Loading | $Cs_2O$ | $TiO_2$ | $SiO_2$ |
| 1:2.5:2.3 | 17 | 43 | 40 |
| 1:2.8:2.5 | 16 | 44 | 40 |
| 1:3.2:2.9 | 14 | 45 | 41 |

Binary systems of cesium with silica or titania are known. Specifically $Cs_2Si_4O_9$, $Cs_2Si_2O_5$, $Cs_2Ti_2O_5$, $Cs_2Ti_4O_9$, $Cs_2Ti_5O_{11}$, and $Cs_2Ti_6O_{13}$ are known binary systems. However, these binary systems have no indication of suitability as containment materials. Binary systems are shown in FIG. 1 as points 12.

Although pollucite exhibits good leach resistance with Cs, and cesium titanium silicate has shown potential as a cesium containment material, there is still a need for a silicotitanate that has a higher loading of titania and a stronger affinity for cesium for cost effective containment of cesium.

SUMMARY OF THE INVENTION

The invention is the discovery of a new phase of a ternary compound of cesium, silica, and titania, together with a method of making the ternary compound, cesium titanium silicate, or cesium silicotitanate. More specifically, the invention is cesium titanium silicate pollucite which is a new crystalline phase representing a novel class of Ti-containing zeolites. The cesium may be radioactive or non-radioactive.

COMPOSITION

The invention, is a cesium titanium silicate or cesium silicotitanate pollucite represented by the chemical formula $CsTiSi_2O_{6.5}$ or $Cs_2Ti_2Si_4O_{13}$. Compositions with high $Cs_2O$ and $TiO_2$ loadings can be thermally converted to durable glass and ceramic materials. The amount of $TiO_2$ and $Cs_2O$ that can be incorporated into these glasses and crystalline ceramics far exceeds the current perceived limits set for the borosilicate HLW glass. Amounts of $TiO_2$ and $Cs_2O$ are preferably greater than about 1 mole % and most preferably greater than about 1 mole % $TiO_2$ and less than about 30 mole % $Cs_2O$. Amounts up to 42 mole % $TiO_2$ and 30 mole % $Cs_2O$ have been achieved. The stable ternary compound, $Cs_2Ti_2Si_4O_{13}$, has a pollucite structure and is a zeolite exhibiting very low Cs leach rates making it a potential waste form for Cs encapsulation. This new material represents a new class of Ti-containing zeolites wherein cages formed within the compound trap the Cs ions. The chemical durability for all individual phases or mixture of phases in the $Cs_2O$—$SiO_2$—$TiO_2$ ternary is unique and depends on the structure of the crystalline material or amorphous material, and the amount of Cs that is contained in either phase.

Thermal conversion of a variety of compositions within the $Cs_2O$—$TiO_2$—$SiO_2$ phase diagram yielded both glass and crystalline materials, some of which show low leach rates and negligible Cs losses during heat treatment.

METHOD OF MAKING

Making cesium titanium silicate pollucite involves (1) selecting amounts of the three constituents (cesium, silica, and titania), combining the three constituents, then (4) heat treating the combined constituents. The compound can be formed by a simple heat treatment to 700° C. to 1000° C., preferably 750° C. to 950° C. The ease of processing, high TiO$_2$ capacity and relatively low heat treatment temperatures make "direct thermal conversion" to a waste form a potential alternative to dissolution in a borosilicate glass. At the optimal processing temperature for silicotitanate pollucite, the Cs volatility is negligible; i.e., orders of magnitude lower than the Cs volatility at the melting temperature of a borosilicate glass. The "direct conversion" technique produces waste volumes that are smaller than the volume of the original separations media, and therefore, reduces the volume of HLW generated as compared to the borosilicate dissolution option.

Direct conversion of Cs loaded silicotitanate ion exchangers to Cs$_2$Ti$_2$Si$_4$O$_{13}$ is an excellent alternative to dissolving the Cs-loaded or Cs-eluted exchangers in borosilicate glass because (1) Cs$_2$Ti$_2$Si$_4$O$_{13}$ is formed using a simple, one step heat treatment, (2) The unique crystalline pollucite-like structure of Cs$_2$Ti$_2$Si$_4$O$_{13}$ traps Cs, and exhibits extremely low Cs leach rates, (3) Cs$_2$Ti$_2$Si$_4$O$_{13}$ is converted to solid waste at a low processing temperature of 700° C. to 1000° C. (nominal melter operating temperatures are 1150° C.), (4) Cs$_2$Ti$_2$Si$_4$O$_{13}$ concentrates the waste, thereby generating less of expensive high level waste, and, (5) Cs losses due to volatilization during processing of Cs$_2$Ti$_2$Si$_4$O$_{13}$ are extremely low.

Alternatively, the cesium silicotitanate pollucite may be formed wherein the step of combining includes synthesizing precursor materials of the three constituents, then hydrolyzing the precursor materials. It is an object of the present invention to provide a ternary compound, cesium titanium silicate pollucite, that is chemically stable and durable.

It is a further object of the present invention to provide a ternary compound, cesium silicotitanate pollucite, that has a titanium loading greater than about 2 wt %.

It is yet a further object of the present invention to provide a ternary compound, cesium silicotitanate pollucite, that exhibits a zeolitic structure.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
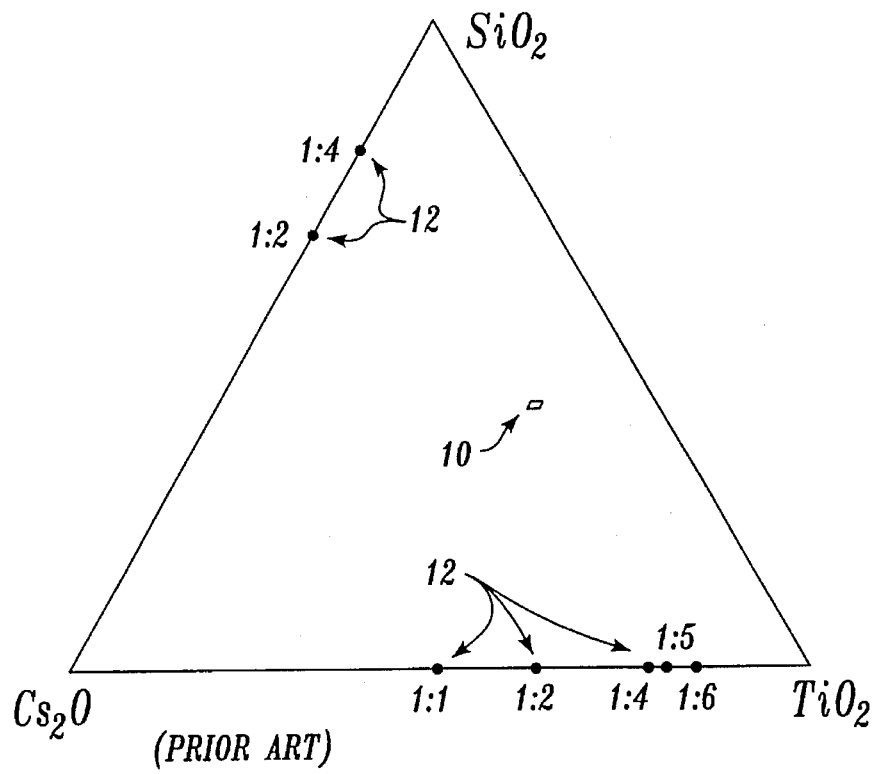
FIG. 1 is a phase diagram showing binary and ternary prior art compositions having two or more of silica, cesium oxide, or titania.
Figure 2:
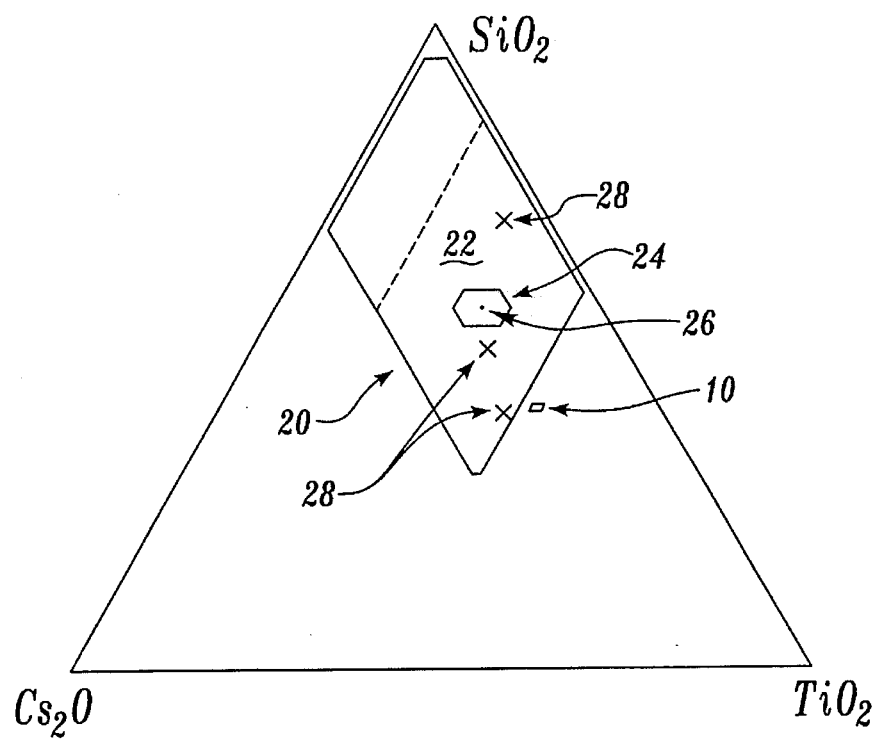
FIG. 2 is a phase diagram showing the invention of ternary compositions.

The present invention is a ternary compound of cesium titanium silicate pollucite made from a primary compound of cesium a secondary compound of silicon, and a tertiary compound of titanium. The ternary compound exhibits several combinations in a phase diagram wherein each phase or combination of phases is determined by the proportion of primary, secondary and tertiary compound used to prepare the ternary compound. Preferred proportions are 5–30 mole % Cs$_2$O, 5–42 mole % TiO$_2$, and 30–80 mole % SiO$_2$, more preferably 14–20 mole % Cs$_2$O, 29–40 mole % TiO$_2$, and 40–57 mole % SiO$_2$, and most preferably 14 mole % Cs$_2$O, 57 mole % TiO$_2$, and 29 mole % SiO$_2$. Within the preferred and more preferred compound proportion ranges, the ternary compound material has mixed phases of partial pollucite with at least a second phase. The most preferred compound proportion range results in substantially pure single phase cesium silicotitanate pollucite. The preferred, more preferred and most preferred proportion ranges are shown in FIG. 2 where region 20 is the preferred range wherein an amount of the Cs$_2$O ranges from 1 to 30 mole %, an amount of the TiO$_2$ ranges from 1 to 42 mole %, and an amount of the SiO$_2$ ranges from 30 to 95 mole %. Region 22 is the more preferred range wherein the amount of Cs$_2$O ranges from 1 to 30 mole %, the amount of TiO$_2$ ranges from 15 to 42 mole %, and the amount of SiO$_2$ ranges from 30 to 84 mole %. Region 24 is the most preferred range wherein the amount of Cs$_2$O ranges from 10 to 18 mole %, the amount of TiO$_2$ ranges from 25 to 32 mole %, and the amount of SiO$_2$ ranges from 54 to 60 mole %. Region 10, taken from FIG. 1 shows the proportion ranges studied by Inoue et al. Exact stoichiometry of CsTiSi$_2$O$_{6.5}$ pollucite is point 26 in FIG. 2 wherein the amount of Cs$_2$O is 14 mole %, the amount of TiO$_2$ is 29 mole %, and the amount of SiO$_2$ is 57 mole %. Points 28 in FIG. 2 are materials having an amount of CsTiSi$_2$O$_{6.5}$ pollucite together with other phase(s).

The cesium titanium silicate pollucite of the present invention has the chemical formula

$$Cs_xTi_ySi_zO_n$$

wherein x, y, z and n are integers. For the pollucite phase of the present invention, the integers are x=2, y=2, z=4, and n=13. The pollucite phase may be pure or mixed with other phases with x and y ranging from 1 to 2, z ranging from 1 to 5, and n ranging from 5 to 13.

Cs$_2$Ti$_2$Si$_4$O$_{13}$, with the pollucite structure, is a new material which may be used as a waste form for containment of Cs. When cesium titanium silicate is used as an exchange medium for cesium encapsulation, sodium may be retained in many of the exchange sites. When considering both the thermal limitations of the cesium titanium silicate exchange material and the maximum selectivity of Cs at a pH of 14 (typical of tank waste), a realistic loading of Cs may be from about 1% to about 6% of the total exchange sites. Therefore, the actual composition of the loaded exchange medium will depend on 1) the Cs and Na loadings; 2) the ratio of Si:Ti in the exchange medium composition, along with any minor constituents that are incorporated into the exchange medium to improve the performance; and 3) the composition of the binder used to consolidate the exchange medium particles. Direct thermal conversion of the composition represented by the actual constituents may produce phases that are different than those formed from the simple three-component model system. Our current understanding of both the $Cs_2O$ and $Na_2O$ silicotitanate phase diagrams will help predict and tailor the phase selection from the actual exchange materials.

For example, if a compound having the effective "pollucite" composition of $M_2O$—$2TiO_2$—$4SiO_2$ were loaded with 90% of the sites occupied with Na, and 10% of the sites occupied with Cs, the phases that form upon heating would be 10% "pollucite" (containing all of the Cs) plus 90% of $Na_2TiSi_4O_{11}$ +$TiO_2$ provided no mixed Cs-Na phases form. A waste form containing the above phase would exhibit chemical durability overall (dominated by the $Na_2TiSi_4O_{11}$) and good Cs-leach resistance (dominated by the pollucite). Phase selection as a function of heat treatment of an actual silicotitanate ion exchange material with a range of Cs loadings, is required to develop a waste form. If needed, the composition of the loaded exchanger could be tailored by adding small amounts of glass or other components to obtain a durable phase such as the silicotitanate pollucite.

METHOD OF MAKING

Cesium titanium silicate materials are made by selecting proportions of cesium, silica and titania, combining them then heat treating them. One way of combining is by mixing oxides or carbonates of cesium, titanium and silicon. Another way is by synthesizing then hydrolyzing precursor materials. As used herein, the term oxide is defined as a compound that includes oxygen and includes but is not limited to titania, carbonates, tetraisopropyl orthotitanate $(Ti[OCH(CH_3)_2]_4)$ (TIOT), and tetraethyl orthosilicate $(Si[O(C_2H_5)]_4)$ (TEOS).

Synthesized and hydrolyzed cesium titanium silicate material(s) begin with titanium and silicon alkoxides, preferably TIOT and TEOS. Any silicon and/or titanium containing oxide may be used.

The cesium is provided as a cesium hydroxide or any cesium containing compound.

The alkoxides are mixed in an inert atmosphere, preferably a nitrogen atmosphere. It will be apparent to one skilled in the art of providing inert atmospheres that other noble gases may be used including but not limited to, argon, and xenon. The cesium hydroxide is solubilized in water and ethanol and added dropwise to the alkoxide mixture resulting in hydrolysis and condensation reactions:

Hydrolysis:

$$M(OR)_4 + H_2O \rightarrow HO—M(OR)_{3+ROH} \quad (1)$$

Condensation:

$$(OR)_3M—OH + HO—M(OR)_3 \rightarrow (OR)_3M—O—M(OR)_3 + H_2O$$

or $$(OR)_3M—OR + HO—M(OR)_3 \rightarrow (OR)_3M—O—M(OR)_3 + ROH \quad (2)$$

In a preferred one-step synthesis, both TIOT and TEOS were mixed and hydrolyzed simultaneously, by a solution of water:ethanol having a ratio of about 1:1 The ratio is preferably at least 1:0.1 to any maximum dilution of ethanol. The synthesized product is aged for at least 1 hour.

Either a synthesized product, or a mixture of oxides is then heat treated by heating to a temperature from about 700° C. to about 1000° C., preferably from about 700° C. to about 800° C. to obtain cesium titanium silicate.

EXAMPLE 1

Because the hydrolysis and condensation rates of TIOT are faster than TEOS, the possibility of a two-step synthesis was explored. An experiment was conducted to compare a two-step synthesis to a one-step synthesis.

In a two-step synthesis, the TEOS was partially hydrolyzed before addition TIOT.

In a one-step synthesis, the TEOS and TIOT were mixed then hydrolyzed simultaneously.

In both syntheses, the alcohol:water ratio and mixing time were varied. The alcohol:water ratio was varied from 1:0.1 to 1:100.

Samples made were examined by Energy Dispersive Spectroscopy (EDS) in a transmission electron microscope (TEM), as well as by x-ray diffraction (XRD) analysis. The samples were analyzed for homogeneity of the cesium titanium silicate.

All samples produced with the two-step synthesis were inhomogeneous powders.

The one-step synthesis having a water:ethanol ratio of about 1:1 and having aged the synthesized product for at least 15 hours resulted in the desired homogeneous amorphous precursor and is the preferred synthesis method.

EXAMPLE 2

An experiment was conducted to characterize cesium titanium silicate compositions phases. Eleven (11) cesium titanium silicate compositions were made according to the procedure of the present invention as summarized in Table 1.

TABLE 1

| Cesium titanium silicate Compositions for Phase Analysis. | | | | | | |
|---|---|---|---|---|---|---|
| | SiO$_2$ | | TiO$_2$ | | Cs$_2$O | |
| | mol % | wt % | mol % | wt % | mol % | wt % |
| Cs$_2$TiSiO$_5$ (1:1:1) | 33.3 | 14 | 33.3 | 19 | 33.3 | 67 |
| Cs$_2$Ti$_2$Si$_2$O$_9$ (1:2:2) | 40 | 21 | 40 | 29 | 20 | 50 |
| Cs$_2$TiSi$_3$O$_9$ (1:1:3) | 60 | 33 | 20 | 15 | 20 | 52 |
| Cs$_2$TiSi$_5$O$_{13}$ (1:1:5) | 72 | 45 | 14 | 12 | 14 | 43 |
| Cs$_2$Ti$_2$SiO$_7$ (1:2:1) | 25 | 12 | 50 | 32 | 25 | 56 |
| Cs$_2$Ti$_2$Si$_4$O$_{13}$ (1:2:4) | 57 | 36 | 29 | 22 | 14 | 42 |
| Cs$_4$TiSi$_5$O$_{14}$ (2:1:5) | 62.5 | 32 | 12.5 | 8 | 25 | 60 |
| Cs$_2$TiSi$_2$O$_7$ (1:1:2) | 50 | 25 | 25 | 17 | 25 | 58 |
| Cs$_4$Ti$_2$Si$_3$O$_{12}$ (2:2:3) | 43 | 20 | 28.5 | 18 | 28.5 | 62 |
| Cs$_4$Ti$_3$Si$_3$O$_{14}$ (2:3:3) | 37.5 | 18.4 | 37.5 | 24.3 | 25 | 57.3 |
| Cs$_2$Ti$_2$Si$_3$O$_{11}$ (1:2:3) | 50 | 29 | 33.3 | 26 | 16.7 | 45 |
| Cs$_2$Ti$_4$Si$_6$O$_{17}$ (1:4:6) | 55 | 38 | 36 | 33 | 9 | 29 |

Analysis

Thermogravimetric analysis (TGA) at a rate of 10° C./min, differential thermal analysis (DTA) at a rate of 15° C./min, and differential scanning calorimetry (DSC) at a rate of 10° C./min, were performed on all eleven dried precursor compositions to determine the temperature at which decomposition, crystallization, and melting events occurred. Other heat treatments were performed at a rate of 5° C./min in air, using approximately 0.5 g of the dried precursor powder in a platinum crucible.

Heat-treated samples were analyzed for the nature and volume fraction of crystalline phases using room temperature XRD. Select samples were analyzed using magic angle spinning nuclear magnetic resonance (MAS NMR), x-ray photoelectron spectroscopy (XPS), and TEM. The $^{133}Cs$ MAS NMR spectra were recorded at a resonance frequency of 39.133 MHz with 200 to 4000 scans, 1.0 μs pulses, and a delay of 12 μs between pulses. A 1M aqueous solution of CsCl was used as a reference standard.

Phase Selection

The phase selection, crystallization temperatures, and volume fraction of crystalline phase (as estimated by XRD) as a function of heat treatment temperature for the eleven silicotitanate precursor materials are summarized in Table 2. Decomposition and crystallization events were distinguished for each composition by comparing the Thermo-Gravimetric Analyses (TGA), Differential Scanning Calorimetry (DSC), and Differential Thermal Analysis (DTA) results.

An exothermic or endothermic event in the DSC or DTA in the absence of a weight loss in the TGA indicates that a phase change has occurred.

In general, all samples showed the majority of weight loss (≈20 wt %) by 150° C., with minor weight losses (<2 wt %) up to 500° C. Crystallization occurred, after the initial weight loss, at a unique temperature for each composition. The phase evolution, relationships between the phases, and some physical properties of each composition are discussed below.

Figure 3:
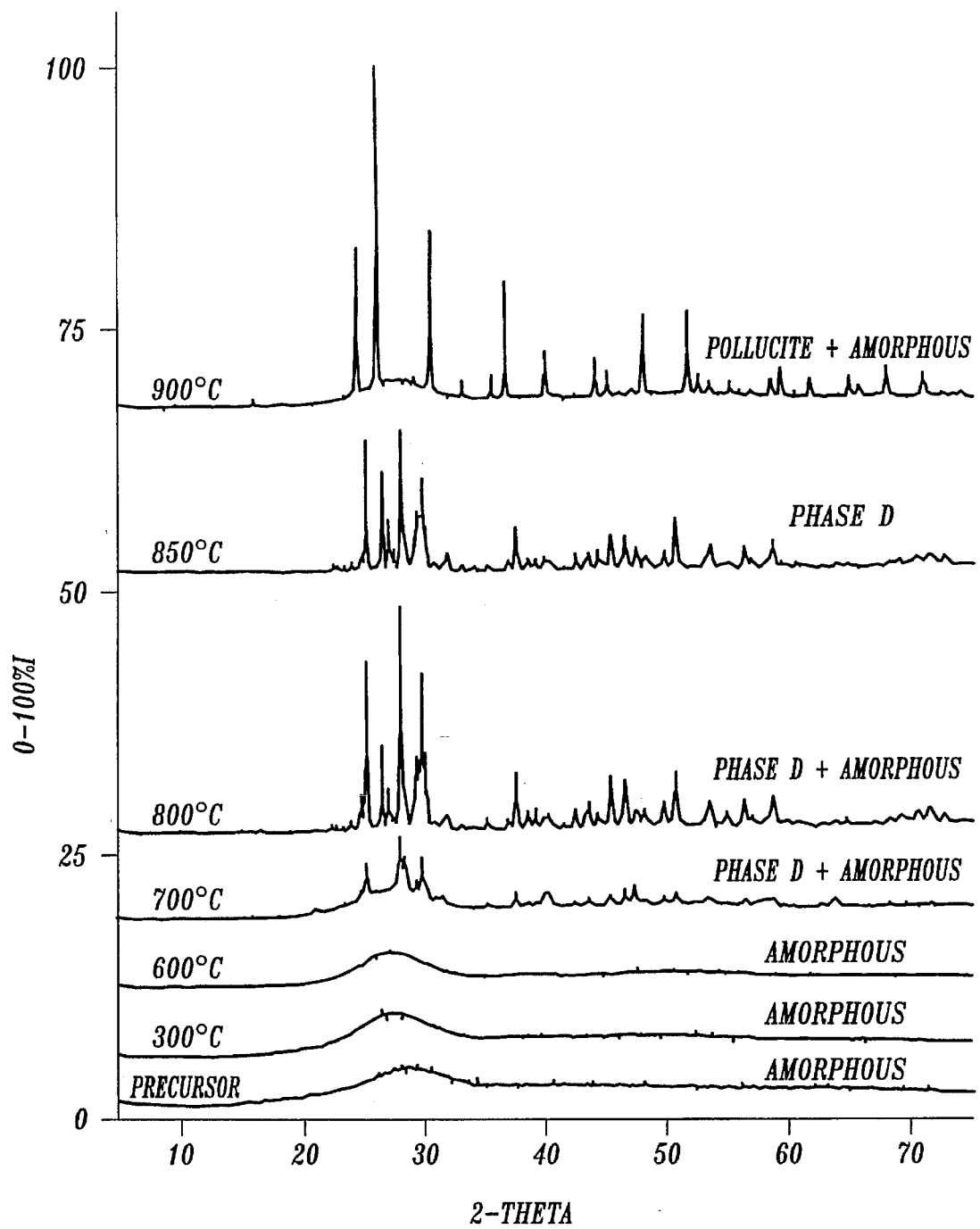
FIG. 3 is a powder X-ray diffraction spectra of Cs$_2$Ti$_2$Si$_2$O$_9$(1:2:2) as a function of heat treatment temperature.

Cesium Silicotitanate Pollucite $Cs_2Ti_2Si_4O_{13}$, $Cs_2Ti_2Si_2O_9$ and $Cs_2Ti_2Si_3O_{11}$ (1:2:4, 1:2:2 and 1:2:3): The 1:2:2 composition was chosen based on the sodium analog which forms a single phase material isostructural to the mineral Lorenzenite. $Cs_2Ti_2Si_2O_9$ unexpectedly does not form a single phase, but rather, crystallizes to a metastable "Phase D" from 700 to 850° C., then melts at 900° C. The melt recrystallizes on cooling to form a phase isostructural to pollucite ($CsAlSi_2O_{6.5}$), plus an amorphous material, as shown in FIG. 3. The metastable phase or phases denoted as phase D could not be matched to any existing diffraction files and could not be indexed. Because of the complexity of the diffraction pattern, phase D probably represents two or more metastable crystalline phases. TEM and energy dispersive spectroscopy (EDS) examination of 1:2:2, 900° C., showed the existence of large crystals of "pollucite" with embedded Ti-rich precipitates. The Ti-rich precipitates were not detected in XRD, either because the precipitates are poorly crystalline or because of the small size and limited quantity. The amorphous constituent is a separate phase that is Si-rich by EDS.

A number of specific compositions that can comprise the amorphous Si-rich and the Ti-rich precipitates exist. The Ti-rich precipitate may contain one of the $Cs_2O$—$TiO_2$ intermediates shown on the binary join.

Figure 4:
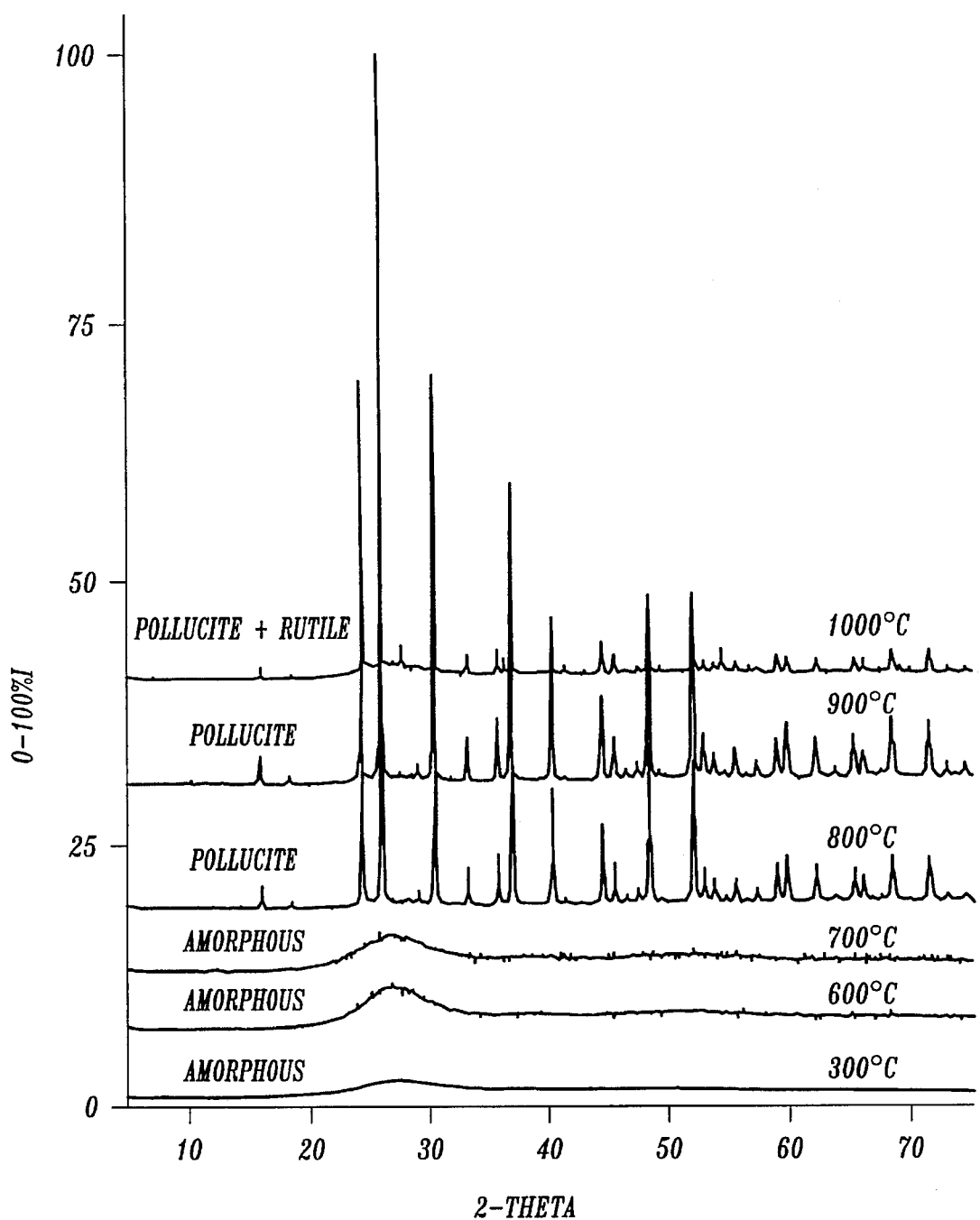
FIG. 4 is a powder X-ray diffraction spectra of CsTiSi$_2$O$_{6.5}$ (1:2:4) as a function of heat treatment temperature.

The composition of the pollucite phase $Cs_2Ti_2Si_4O_{13}$, precursor was fabricated, heat treated, and analyzed for phase formation. As illustrated in FIG. 4, $Cs_2Ti_2Si_4O_{13}$

TABLE 2

Phase Development with Temperature for Cs-Silicotitanates

| Temp., °C. | (1:1:1) | (1:2:2) | (1:1:3) | (1:1:5) | (1:2:1) | (1:2:4) |
|---|---|---|---|---|---|---|
| 300 | Amorph. | Amorph. | Amorph. | Amorph. | Amorph. | Amorph. |
| 600 | Amorph. + 30% (C + $Cs_2TiO_4 \cdot H_2O$) | Amorph. | Amorph. | Amorph. | Amorph. | Amorph. |
| 700 | | Amorph. + 15% D | Amorph. | Amorph. | Amorph. + 20% G | Amorph. |
| 800 | Amorph. + 10% $Cs_2TiO_4 \cdot H_2O$ | 60% D + Amorph. | Amorph. + 20% E | Amorph. | Amorph. + 15% $Cs_2Ti_6O_{13}$ | 98% Polluc. + Amorph. |
| 900 | Amorph. + 5% $Cs_2TiO_4 \cdot H_2O$ (melt) | 70% Polluc. + Amorph. (melt) | Amorph. + 20% E | Amorph. (melt) | Amorph. + 10% $Cs_2Ti_6O_{13}$ (melt) | 98% Polluc. + Amorph. |
| 1000 | Amorph. + 5% $Cs_2TiO_4 \cdot H_2O$ | | Amorph. (melt) | Amorph. + 7% F | Amorph. + 30% $Cs_2Ti_6O_{13}$ | 95% Polluc. + 3% $TiO_2$ + Amorph. |

| Temp. °C. | (1:4:6) | (1:1:2) | (1:2:3) | (2:1:5) | (2:2:3) | (2:3:3) |
|---|---|---|---|---|---|---|
| 300 | Amorph. | Amorph. | Amorph. | Amorph. | Amorph. | Amorph. |
| 600 | Amorph. | Amorph. | Amorph. | Amorph. + 10% $Cs_2TiO_4 \cdot H_2O$ | Amorph. + 10% $Cs_2TiO_4 \cdot H_2O$ | Amorph. |
| 700 | Amorph. + 8% $TiO_2$ | Amorph. + 15% H | Amorph. + 10% (Polluc. + J) | Amorph. + 5% $Cs_2TiO_4 \cdot H_2O$ | Amorph. + 40% $Cs_2TiO_4 \cdot H_2O$ | Amorph. + 30% K |
| 800 | Amorph. + 10% $TiO_2$ | Amorph. + 30% H | Amorph. + 55% (Polluc. + J) | Amorph. + 20% $Cs_2TiO_4 \cdot H_2O$ | Amorph. + 25% $Cs_2TiO_4 \cdot H_2O$ | Amorph. + 15% K |
| 900 | Amorph. + 15% $TiO_2$ | Amorph. + 35% H | Amorph. + 50% Polluc. | Amorph. + 20% $Cs_2TiO_4 \cdot H_2O$ | Amorph. + 5% $Cs_2TiO_4 \cdot H_2O$ | Amorph. |
| 1000 | | | | Amorph. + 1% $Cs_2TiO_4 \cdot H_2O$ | | Amorph. | remains amorphous until 750° C., where it begins to crystallize with a structure isomorphous to pollucite. By 800° C. the material is 98 vol % "pollucite" with a minor amount of residual amorphous phase. After heat treatment to 900° C., the structure partitions to form $TiO_2$ (<3 vol %), "pollucite", and an amorphous phase. The small amount of amorphous phase present at 800° C. may be due to 1) incomplete crystallization of pollucite due to kinetic constraints, or 2) a slight compositional variation from the lowest free energy composition for the "pollucite" phase. The appearance of rutile at higher temperatures indicates that some phase partitioning is occurring, thus supporting the second premise. The formation of a phase with the pollucite structure has not been reported for any other alkali or alkaline earth silicotitanates. Glassar and Marr, who performed a careful study of the phase relations in the $Na_2O$—$TiO_2$—$SiO_2$ system, did not report the existence of a single phase material for $NaTiSi_2O_6$.[6]. Prewitt et al. reported the formation of a monoclinic single phase material of composition $NaTiSi_2O_6$ for $Na_2SiO_3+Ti_2O_3+SiO_2$ heat treated to 1550° C. at 65 kbar.[21]

The phase selection and partitioning behavior of $Cs_2Ti_2Si_4O_{13}$, $Cs_2Ti_2Si_2O_9$, and $Cs_2Ti_2Si_3O_{11}$ show that $Cs_2Ti_2Si_4O_{13}$ exists as a stable ternary phase, and that $Cs_2Ti_2Si_2O_9$ and $Cs_2Ti_2Si_3O_{11}$ lie in a three phase region where $Cs_2Ti_2Si_4O_{13}$ is one of the terminating phases. Based on the phase selection and EDS results, partitioning schemes for $Cs_2Ti_2Si_2O_9$ and $Cs_2Ti_2Si_3O_{11}$ are estimated as $$4Cs_2Ti_2Si_2O_9 \rightarrow 2CsTiSi_2O_{6.5} \text{ (poll.)} + Cs_2Ti_6O_{13} \text{ (ppt.)} + (2Cs_2O.4SiO_2 \text{ amorph.})$$

and $$4Cs_2Ti_2Si_3O_{11} \rightarrow Cs_2Ti_2Si_4O_{13} \text{ (poll.)} + Cs_2Ti_6O_{13} \text{ (ppt.)} + (2Cs_2O.8SiO_2 \text{ amorph.}).$$

Other Cesium Silicotitanate Phases $Cs_2Ti_2SiO_7$ (1:2:1): This composition partially crystallizes (≈20 vol %) at 700° C. into an unidentifiable "phase G" which is similar to $Cs_2Ti_6O_{13}$. From 800° to 900° C., the material is primarily an amorphous phase (85 to 90 vol %) plus a crystalline phase similar to $Cs_2Ti_6O_{13}$ Above 900° C. the material melts and precipitates $Cs_2Ti_6O_{13}$ (≈30 vol %) on cooling. The relative peak intensities of the $Cs_2Ti_6O_{13}$ phase change with heat treatment temperature. The following equation represents the phase partitioning behavior, assuming all the Ti is contained in the crystalline phase:

$$3Cs_2Ti_2SiO_7 \rightarrow Cs_2Ti_6O_{13} \text{ (crystal.)} + Cs_4Si_3O_8 \text{ (amph.)}$$

Because no known stable compounds are represented by the amorphous composition, it is expected to partition into two stable phases after longer times at high temperatures. Due to the large amounts of Cs concentrated in the amorphous phase, this material is likely to have poor resistance to aqueous attack, and thus, would not serve as an acceptable waste form.

$Cs_2TiSiO_5$ (1:1:1), $Cs_4Ti_2Si_3O_{12}$ (2:2:3) and $Cs_4TiSi_5O_{14}$ (2:1:5): The 1:1:1 composition forms a stable ternary compound in the lithium, sodium, and calcium silicotitanate systems as reported by F. P. Glasser, and J. Marr, "Phase Relations in the System $Na_2O$—$TiO_2$—$SiO_2$," *J. Am. Cer. Soc.*, Vol. 62, No. 1–2, pp. 42–47, 1979, also by R. C. DeVries, R. Roy, and E. F. Osborn, "Phase Equilibria in the System $CaO$—$TiO_2$—$SiO_2$," *J. Am. Cer. Soc.*, Vol. 38, No. 5, pp. 158–171, 1955, and *Powder Diffraction File*, International Center for Diffraction Data, Newton Square Pa., 1994. Our experiments showed that $Cs_2TiSiO_5$ remains primarily amorphous with small quantities of crystalline material from 400° C. to 1050° C. One of the crystalline phases, which persists from 400° C. to 1050° C., was identified as $Cs_2TiO_4.H_2O$. The other metastable crystalline phase or phases present between 400° and 800° C. could not be identified and were unrelated to any of the crystalline phases seen in other compositions. A clear glass which contains less than 5 vol % crystalline $Cs_2TiO_4.H_2O$ forms after melting at 900° C. The small amount of $Cs_2TiO_4.H_2O$ present in the glass drastically effects the stability of the glass, causing it to adsorb water and degrade when exposed to ambient conditions. Therefore, $Cs_2TiSiO_5$, or any composition within the phase triangle which contains the $Cs_2TiO_4.H_2O$ phase, would not be an acceptable waste form because of its inherent instability in moist conditions. $Cs_4Ti_2Si_3O_{12}$ and $Cs_4TiSi_5O_{14}$ also formed an unidentified crystalline phase of $Cs_2TiO_4.H_2O$ and an amorphous phase.

$Cs_2TiSi_3O_9$ (1:1:3) and $Cs_2TiSi_5O_{13}$ (1:1:5): The 1:1:3 and 1:1:5 compositions are similar in that they both form a clear glass after melting. However, the two compositions exhibit unique phase selection below the melting temperature. $Cs_2TiSi_3O_9$ remains amorphous up to 800° C., where it partially crystallizes (20 vol %) into an unidentifiable, metastable phase that is unrelated to any of the phases seen for other cesium titanium silicate compositions. Formation of a glass at this composition indicates that the glass forming regime for cesium titanium silicates is larger than that for sodium. By comparison, the sodium silicotitanate 1:1:3 composition partitions into two stable crystalline phases, $Na_2TiSi_2O_7$ (1:1:2) and $Na_2TiSi_4O_{11}$ (1:1:4) as reported by Glasser and Marr, 1979. Compositions that contain less Ti and are slightly more Si-rich, readily form glasses in the sodium system. The 1:1:3 composition exists as a stable crystalline single phase in the potassium, rubidium, and barium silicotitanate systems as reported in the Powder Diffraction File, 1994.

The 1:1:5 cesium titanium silicate composition is the only composition that remains amorphous up to the melting temperature (900° C.). A clear glass, which contains 12 wt % $TiO_2$ and 43 wt % Cs, and shows no evidence of any crystalline material, forms after melting. After 1 hour at 1000° C., a very small amount of material recrystallizes on cooling. Some of the peak positions of the crystalline phase are close to those of pollucite, indicating that this composition may lie in a 3-phase regime where pollucite exists as one of the stable crystalline phases. The other phases are likely to be one of the cesium silicates, $Cs_2Si_4O_9$ or $Cs_2Si_2O_5$. Therefore, the overall partitioning scheme is estimated as $$2Cs_2TiSi_5O_{13} \rightarrow 2CsTiSi_2O_6 + Cs_2Si_4O_9 + 2SiO_2.$$

Because no other alkali or alkaline earth silicotitanates with the 1:1:5 stoichiometry are known to exist as stable single-phase materials as reported in the Powder Diffraction File, 1994, the stable single-phase cesium titanium silicates were surprising and unexpected.

$Cs_2Ti_4Si_6O_{15}$ partitioned into an amorphous phase plus $TiO_2$ at high temperature. $Cs_2TiSi_2O_7$ crystallized at 700° C. into an unidentified phase. $Cs_4Ti_3Si_3O_{14}$ partially crystallized into an unidentified phase at 700° C. then remelted to form a 100% amorphous solid after cooling from temperatures greater than 900° C.

EXAMPLE 3

Structural analysis tools, including XRD, NMR and XPS, were used to develop a structural model of the new crystalline phase of $Cs_2Ti_2Si_4O_{13}$ pollucite. A powder diffraction simulation program (Micro-POWD, Materials Data, Inc., Livermore, Calif.) was used to generate a theoretical diffraction pattern for the pollucite structure with Ti atoms in the $Al^{+3}$ site of $CsAlSi_2O_6$. Pollucite, $CsAlSi_2O_6$ is a zeolite with the Al and Si in tetrahedral sites, and the Cs trapped in a large cage formed by the aluminosilicate network as reported by R. M. Beger, "The Crystal Structure and Chemical Composition of Pollucite," Z. Kristallogr., 129, pp. 280–302, 1969.

Figure 5:
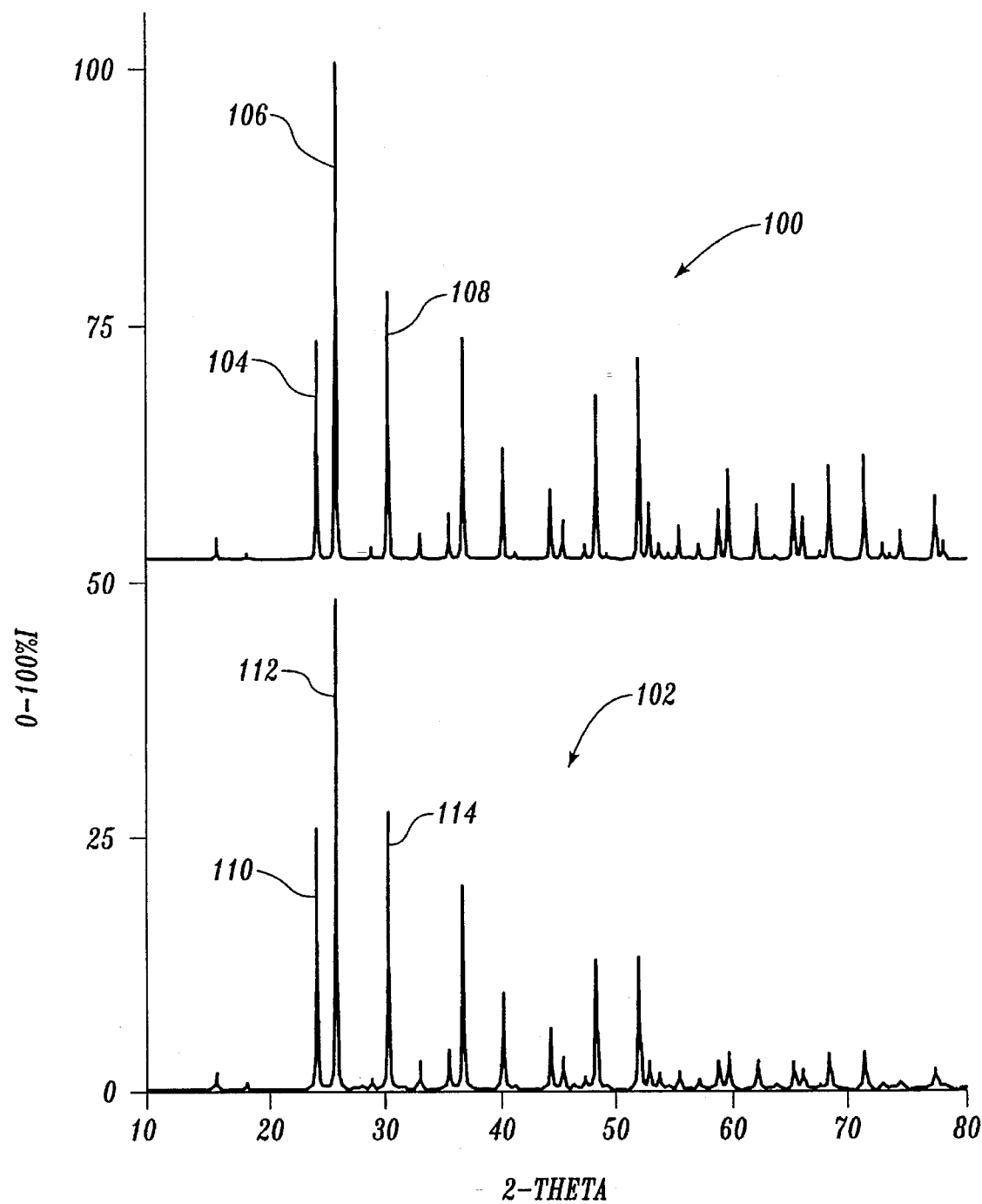
FIG. 5 is a powder X-ray diffraction pattern for simulated and experimental CsTiSi$_2$O$_{6.5}$.

As shown in FIG. 5, pattern 50 of the peak positions and intensities generated by the simulation program are an excellent match to the experimental data pattern 52. Note especially simulated peaks 54, 55, 56 and measured peaks 57, 58, 59. This indicates that significant deviations of $Cs_2Ti_2Si_4O_{13}$ from the pollucite structure do not exist.

$^{133}Cs$ MAS NMR was performed on $Cs_2Ti_2Si_4O_{13}$ heat-treated to 300°, 600°, 700°, 800, and 900° C. $Cs_2Ti_2Si_2O_9$ heat-treated to 900° C., and on the $CsAlSi_2O_6$ mineral pollucite. The chemical shifts are shown in Table 3.

TABLE 3

Chemical Shifts for $^{133}Cs$

|  | Chemical Shift (ppm) |
| --- | --- |
| $Cs_2Ti_2Si_4O_{13}$ (1:2:4) 300° C. | 3.41 |
| $Cs_2Ti_2Si_4O_{13}$ (1:2:4) 600° C. | 47.71 |
| $Cs_2Ti_2Si_4O_{13}$ (1:2:4) 700° C. | 33.87 |
| $Cs_2Ti_2Si_4O_{13}$ (1:2:4) 800° C. | 3.41 |
| $Cs_2Ti_2Si_4O_{13}$ (1:2:4) 900° C. | -1.91 |
| $CsAlSi_2O_6$ | -7.66 |
| ETS-4 | 22.79 |
| $Cs_2Ti_2Si_2O_9$ (1:2:2) 900° C. | 139.07 |
|  | 44.94 |
|  | -4.89 |

Figure 6:
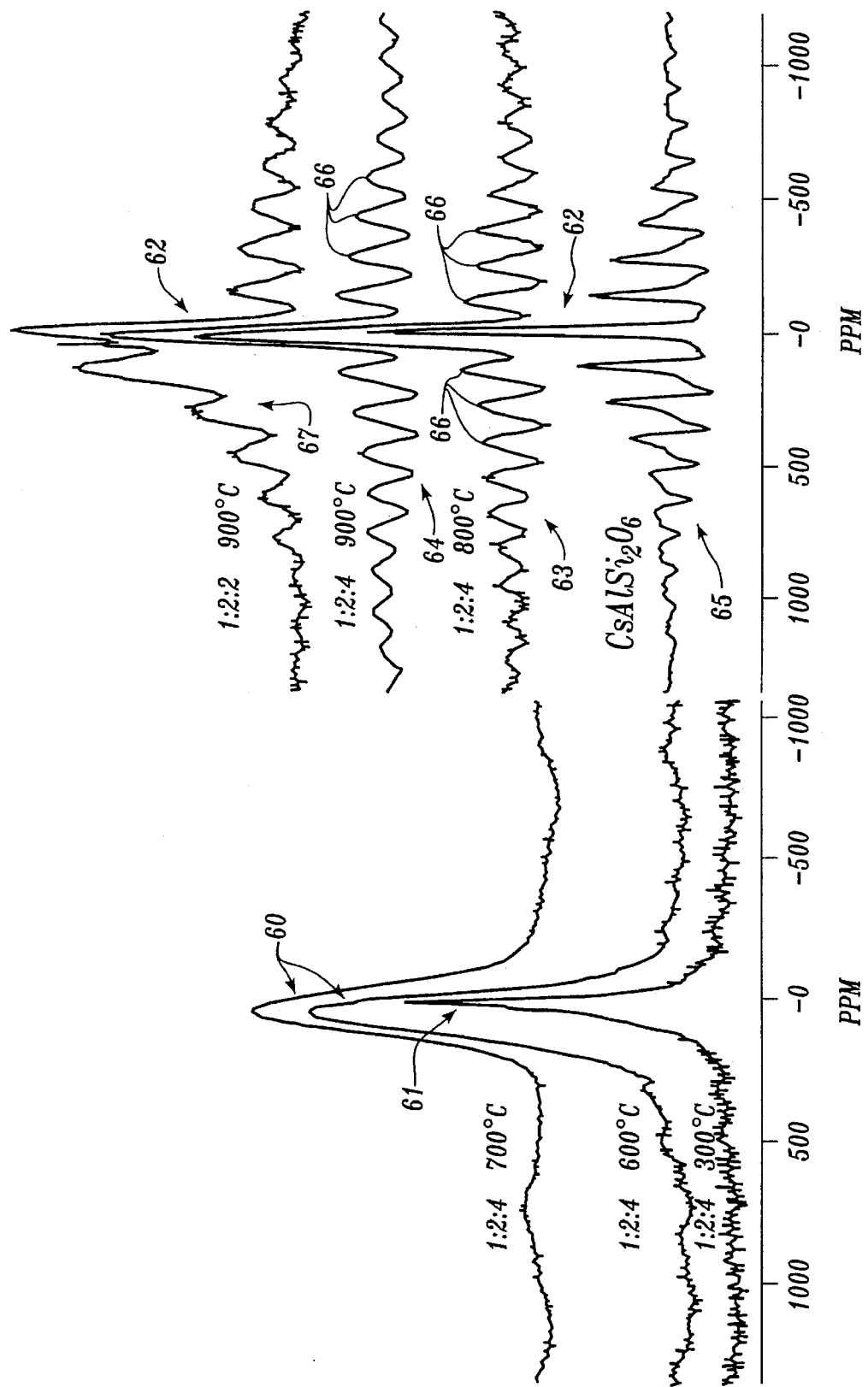
FIG. 6a is a $^{133}$Cs MAS NMR spectra of CsTiSi$_2$O$_6$ heat treated below 800° C.
FIG. 6b is a $^{133}$Cs MAS NMR spectra of CsTiSi$_2$O$_6$ heat treated at 800° C. and above.

The Cs-NMR spectra in FIG. 6a for $Cs_2Ti_2Si_4O_{13}$ below the crystallization temperature show a single broad peak 60 for heat treatments of 600° C. and 700° C., and a slightly narrower peak 61 for the 300° C. heat treatment. After crystallization at 800° C., the peak shifts and sharpens as shown in FIG. 6b, peaks 62. As shown in FIG. 6b, the spectra 63 and 64 of the cesium silicotitanate pollucite ($Cs_2Ti_2Si_4O_{13}$ 800° C. and 900° C.) and the spectra 65 of aluminosilicate pollucite are similar, exhibiting one peak for a single Cs environment and strong spinning sidebands 66 which are symmetrical about the main peaks 62. The spinning sidebands 66 are due to second-order quadrupolar interactions. The spectra 67 of $Cs_2Ti_2Si_2O_9$ 900° C., which is amorphous + pollucite, shows three distinct Cs environments, consistent with the phase analysis results. The $Cs_2Ti_2Si_4O_{13}$ spectra were also compared to that of a Cs-exchanged Englehard silicotitanate material, ETS-4 described by S. M. Kuznicki, K. A. Thrush, F. M. Allen, S. M. Levine, M. M. Hamil, D. T. Hayhurst, and M. Mansour, "Synthesis and Adsorptive Properties of Titanium Silicate Molecular Sieves," in *Synthesis of Microporous Materials, Vol 1—Molecular Sieves*, pp. 427–453, Editor; M. L. Ocelli, Van Nostrand Reinhold, New York, 1992. This material, ETS-4, contains chains of octahedral $Ti^{+4}$ which are linked with tetrahedrally coordinated zeolite-type rings with openings of ≈7.6 Å. The XRD pattern indicates that the structure is similar to the mineral zorite as shown by Kuznicki et al., 1992. The $^{133}Cs$ MAS-NMR spectra for ETS-4 (not shown) exhibits a single, narrow peak with a chemical shift of 22.79 ppm and no spinning sidebands, which was very different than the $^{133}Cs$ MAS-NMR spectra for silicotitanate pollucite.

If it is assumed that $Cs_2Ti_2Si_4O_{13}$ has the exact pollucite structure with Ti replacing Al, then the Ti is required to be in tetrahedral coordination, and to have a valence of $^+3$ to maintain charge balance. $Ti^{+3}$ usually only occurs in reducing environments (heat treatments are done in an oxidizing environment which promotes $Ti^{+4}$), and Ti is typically in octahedral coordination in crystalline silicotitanate materials. X-ray photoelectron spectroscopy (XPS) was used to determine whether the Ti in a powder sample of silicotitanate pollucite material was present as $Ti^{+3}$, or $Ti^{+4}$. A broad peak centered at ≈464 eV, characteristic of $TiO_2$, was shifted -1.97 eV for $Cs_2Ti_2Si_4O_{13}$ 800° C., as compared to $TiO_2$ powder.

Figure 7:
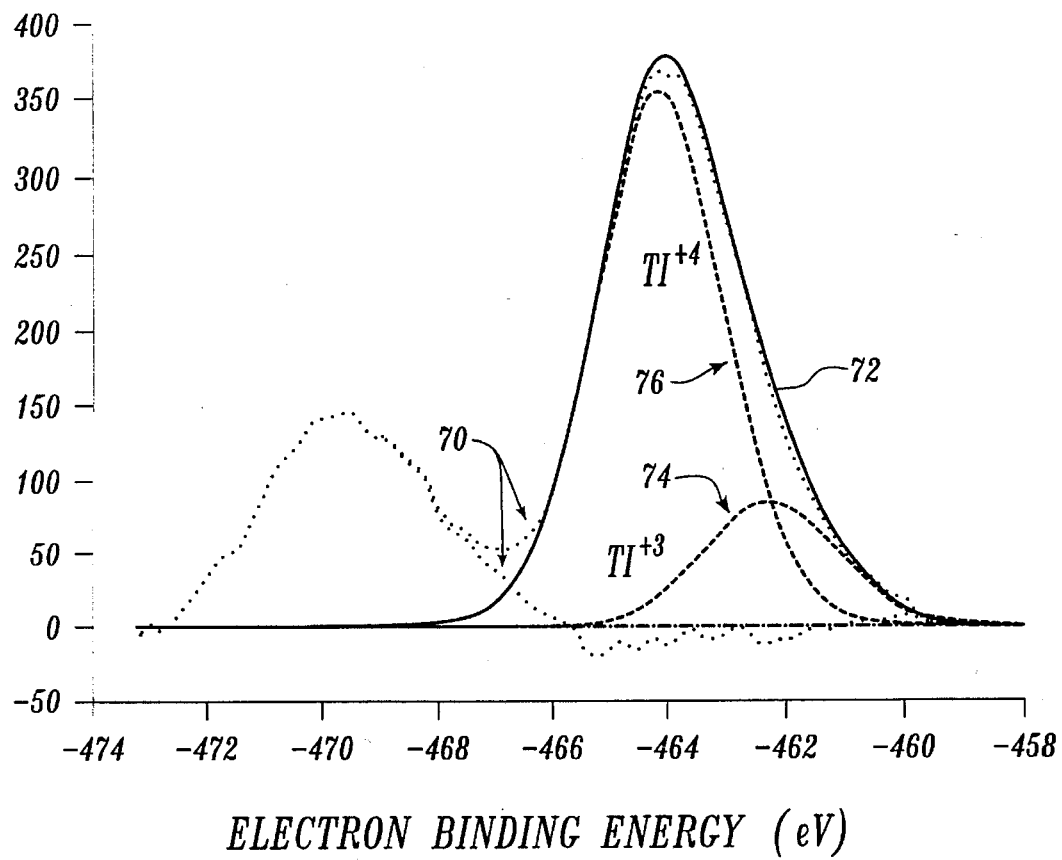
FIG. 7 is an X-ray photoelectron spectrum showing the Ti peak deconvoluted into the contributors from Ti$^{+4}$ and Ti$^{+3}$

Deconvolution of the broad peak shows that $Ti^{+4}$ is the primary valence state, and that $Ti^{+3}$ may be present in small quantities as shown in FIG. 7. The dotted line 70 is raw data. The solid line 72 is a curve fit to the raw data 70. The dashed lines 74, 76 are data deconvoluted to $Ti^{+3}$ and $Ti^{+4}$ respectively. The presence of large amounts of $Ti^{+4}$ is not consistent with the pollucite structure because this will result in a charge balanced silicotitanate network. A net negative charge on the network is necessary to balance the $Cs^{+1}$ contained in network cages. Preliminary analysis using Titanium Extended Adsorption Fine Structure (Ti-EXAFS) and Titanium Extended Adsorption Near Edge Structure (Ti-EXANES) indicated that the Ti is coordinated by 4 or 5 oxygen atoms. It is suspected that the $Ti^{+4}$ occurs in ordered pairs wherein an additional oxygen atom is shared by two 5-fold coordinated Ti atoms. More work, including X-ray absorption spectroscopy, Raman spectroscopy, and electron paramagnetic resonance (EPR), is being performed to reveal the local coordination around the Ti ion and to determine how $Ti^{+4}$ was accommodated in the pollucite structure.

EXAMPLE 4

The material $Cs_2Ti_2Si_4O_{13}$ was characterized by powder X-ray diffraction. Micro-POWD was used to generate estimated structure characterization. The experimental peak positions and d-spacings were corrected for 2-theta error by comparison of the measured and certified positions of the internal d-spacing standard (NIST SRM 640b), followed by application of the resultant second-order correction curve to the original position data. The experimental peak positions were obscured by overlapping peaks of the internal d-spacing standard and were therefore calculated on the basis of the refined unit cell structure. The experimental intensities were the observed peak heights after background subtraction and were derived from the unstandardized diffraction pattern of the cesium titanium silicate pollucite. The experimental intensity data were corrected using the Variable Slit-to-Fixed Slit (1/sin(theta)) function resident in the x-ray powder pattern processing code JADE+, Ver. 2.1 (MDI, Livermore, Calif.). Similarly, the reported calculated intensity data from Micro-POWD were peak heights based on fixed slits. The Miller indices (hkl) were also derived from the output of Micro-POWD.

The study sample also produced four weak, unindexed peaks. The 2-theta error-corrected d-spacings and relative intensities of the unindexed peaks were: 3.6355/2, 3.5332/2, 3.2665/<1, and 3.0228/<1. The unindexed peak at 3.5332 Angstroms indicated the possible presence of a small amount of Anatase, $TiO_2$ (PDF 21-1272) in the sample. However, the match of this peak to reference data for Anatase was not determinative and may have been coincidental. The peak at 3.2665 could be indexed as (330), but this reflection is extinct in Space Group 230. As such, this peak may have been evidence of some spurious ordering phenomenon in the $Cs_2Ti_2Si_4O_{13}$ structure, but was otherwise unidentifiable. Similarly, searches of the Powder Diffraction File database failed to produce matches to the two remaining peaks at 3.6355 and 3.0228.

Diffraction data for a 1:1 weight ratio mixture of $Cs_2Ti_2Si_4O_{13}$ and NIST SRM 674 (Corundum) (<45 micron) was measured for the determination of the relative intensity ratio (1/1c). The experimental value of 1/1c was taken as the ratio of the height of the (400)/100% peak of $Cs_2Ti_2Si_4O_{13}$ to the height of the (113)/100% peak of Corundum. Observed background was first subtracted and the intensity data were corrected to the fixed-slit approximation using JADE+. The resulting experimental value of 1/1c was 2.37 whereas the calculated value was 5.21. Additional testing confirmed that this discrepancy between the experimental data and the calculated value was real and not attributable to experimental error.

EXAMPLE 5

Cesium leach rate was determined for cesium titanium silicate compositions. The Cs leach rate was measured using the MCC-1 standard static leach test described in A STANDARD LEACH TEST FOR NUCLEAR WASTE FORMS, D M Strachan, R P Turcotte, and B O Barnes, Nuclear Technology, Vol. 56, pp 306–312, 1982. Powders were heat-treated to 400° C., pressed to form a pellet, then heat treated to the desired temperature. The pellets were suspended on a polytetrafluoroethylene (PTFE, Teflon) string in de-ionized water contained in a PTFE container for the leach test. After the desired time at a constant temperature, a sample of the solution, with a known volume, was analyzed for the Cs content using atomic absorption spectrometry (AAS). Partial ionization of Cs during AAS analysis was suppressed by adding potassium nitrate to give a final concentration of 1000 μg/mL K to all standards and sample solutions. Nitric acid (1.5 vol %) was also added to all solutions.

The static leach rate of Cs was measured as a function of time for $Cs_2Ti_2Si_2O_9$ glass ceramic, heat-treated to 850° C.; $Cs_2TiSi_5O_{13}$ glass heat-treated to 900° C.; and $Cs_2Ti_2Si_4O_{13}$ pollucite heat-treated from 700° C. to 800° C. Leach tests were not performed on the remaining compositions because of processing difficulties, or compositional instabilities, which rendered the material less suitable for a waste form. $Cs_2TiSi_3O_9$ and $Cs_2Ti_2SiO_7$ compositions foamed during heat treatment, and thus, could not be shaped into a geometric form for leach tests. The $Cs_2TiSiO_5$ composition was extremely sensitive to moisture and degraded rapidly. Pellets shaped from this composition heat-treated to 600° C. deteriorated into powder after only 24 hours in air.

Figure 8:
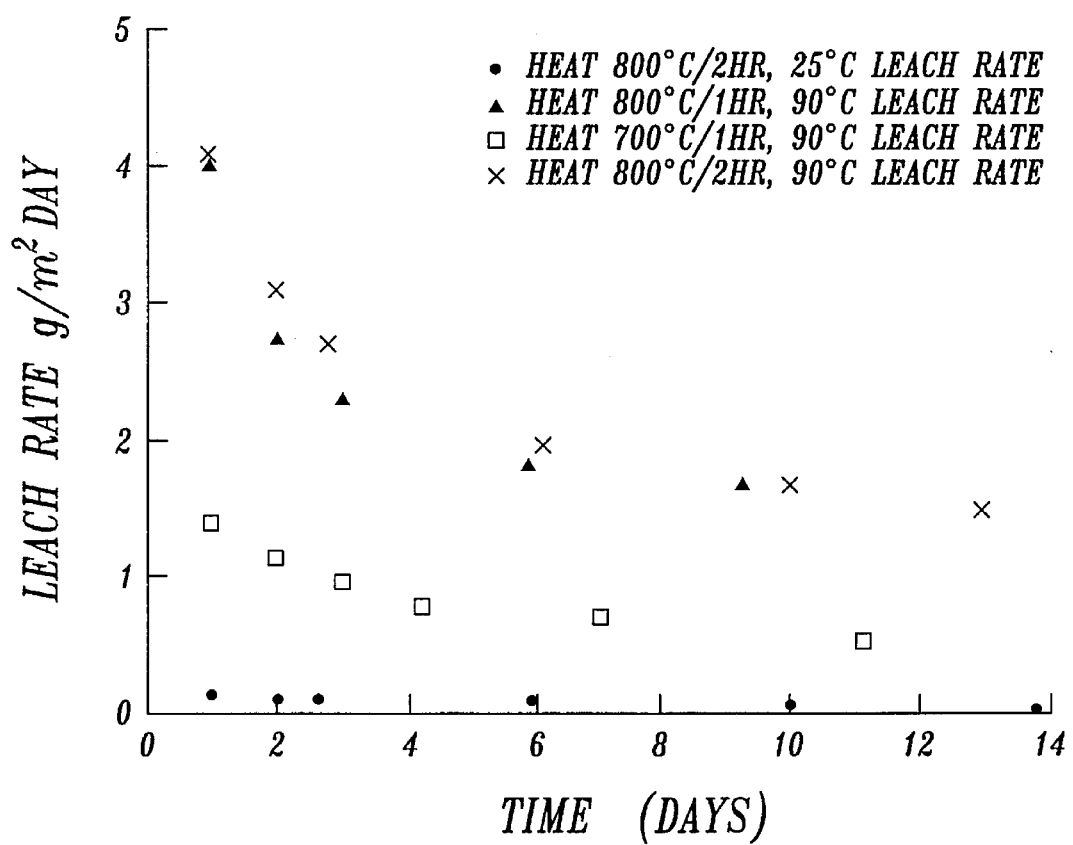
FIG. 8 is a graph of leach rate versus time for CsTiSi$_2$O$_{6.5}$ at various heat treat conditions.

The leach rate for $Cs_2Ti_2Si_4O_{13}$ (silicotitanate pollucite) at 90° C. and 25° C. is shown in FIG. 8 for various heat treatment temperatures and times. Crystalline $Cs_2Ti_2Si_4O_{13}$ heat treated to 800° C./1 hr exhibited a Cs leach rate of 2.29 g/m²day at 90° C. after 24 hours, and of 0.14 g/m²day at 25° C. The Cs leach rate decayed as a function of $t^{1/2}$, yielding a leach rate after 7 days of 1.17 g/m²day and 0.78 g/m²day for 90° C. and 25° C. samples, respectively. Pre-crystalline $Cs_2Ti_2Si_4O_{13}$ exhibited a lower 24-hour leach rate than the crystalline material: 1.42 g/m²day at 90° C. This is comparable to $CsAlSi_2O_6$, prepared from metal nitrate solutions and a silica sol heat-treated to 1350° C., which exhibits leach rates of 1 g/m²day at 100° C. as reported by E. R. Vance, B. E. Scheetz, M. W. Barnes, and B. J. Bodnar, "Studies of Pollucite," in *The Scientific Basis for Nuclear Waste Management*, Stephen V. Topp, editor, Elsevier Science Publishing Co. Inc., 1982.

Pollucite prepared by hydrothermal hot pressing of Cs with an amorphous aluminosilicate exhibits leach rates of 3.15 g/m²day as reported by K. Yanagisawa, M. Nishoka, and N. Yamasaki, "Immobilization of Cesium into Pollucite Structure by Hydrothermal Hot-Pressing," *J. Nuc. Sci. Tech.*, 24[1], pp 51–60, 1987. A direct comparison of the pollucite leach rate with that of borosilicate glass is difficult because the borosilicate compositions tested have a much lower $Cs_2O$ content than $Cs_2Ti_2Si_4O_{13}$.

Papers by L. L. Hench, D. E. Clark, and A. B. Harker, "Review: Nuclear Waste Solids," *J Mat Sci*, Vol 21, pp. 1457–78, 1986, and B. Grambow, and D. M. Strachan, "Leach Testing of Waste Glasses under Near-Saturation Conditions," PNL-SA-11554, 1983, studied PNL 76-68 (a well characterized simulant) having a $Cs_2O$ content of 0.99 wt % and an overall alkali content of 8.41 wt % as opposed to 42 wt % $Cs_2O$ (14 mol %) for $Cs_2Ti_2Si_4O_{13}$. The Cs leach rate for PNL 76-68 is estimated by multiplying the bulk leach rate of ≈1 g/m²day (90° C.) by the fraction of Cs in the glass to yield 0.01 g/m²day.

In reality, a glass with 42 wt % $Cs_2O$ would have a much higher leach rate than that predicted by multiplying the $Cs_2O$ content by the bulk leach rate (0.42 g/m²day). Rana and Douglas measured a leach rate of 8 g/m²day at 85° C. for a silicate glass that contained 15 mol % potassium (M. A. Rana, and R. W. Douglas, "The Reaction Between Glass and Water. Part I. Experimental Methods and Observations," *Phys. and Chem. of Glasses*, Vol. 2, No. 6, pp. 179–195, 1961). From these results, a silicate glass with 14 mol % $Cs_2O$ is estimated to exhibit leach rates of about 10 g/m²day, which are several times greater than for the $Cs_2Ti_2Si_4O_{13}$ at 90° C. shown in FIG. 8. Hence, the leach rates of the cesium titanium silicate pollucite are surprisingly low compared to silicate glass.

Minor amounts of amorphous phase in the silico-titanate-pollucite act to increase the Cs leach rate. This was clearly seen for $Cs_2Ti_2Si_2O_9$, which is 70 vol % crystalline pollucite and 30 vol % amorphous, and exhibits leach rates 8 times faster than crystalline pollucite. The leach rate, as a function of time, for $Cs_2TiSi_5O_{13}$ glass heat-treated to 900° C./1 hour was measured. The leach rate decays as a function of $t^{1/2}$ exhibiting a rate of 5.6 g/m²day after 24 hours and a leach rate of 1.14 g/m²day after 7 days. These values are slightly higher than the values for the 700° C. silicotitanate pollucite but lower than the mixed pollucite glass-ceramic.

From the leach rate data, durability depends on both the thermal history and the composition. The results also show that there is no universal relationships between the leach resistance and the amount of crystalline or amorphous phase. The glass which partitions from $Cs_2Ti_2Si_2O_9$ has poor resistance to aqueous leaching, while the glass formed from $Cs_2TiSi_5O_{13}$ and the amorphous pre-crystalline phase of $Cs_2Ti_2Si_4O_{13}$ show good chemical resistance. In the case of pre-crystalline pollucite (700° C.), the short-range structure, which can not be detected by XRD, is a critical factor in the durability.

EXAMPLE 6

The Cs volatility was measured as a function of heat-treatment temperature for select compositions. A Cs-silicotitanate pollucite sample, which was either a pellet or a powder, was placed in the hot zone in a small pot furnace in a cylindrical, enclosed, platinum (Pt) crucible. The top of the crucible, which extended out of the hot zone, was cooled by convection and acted as a cold finger on which the volatile components were collected. After heat treatment, the top and sides of the Pt crucible/cold finger were washed in 0.2M nitric acid solution. The Cs concentration in the solution was determined by AAS.

Figure 9:
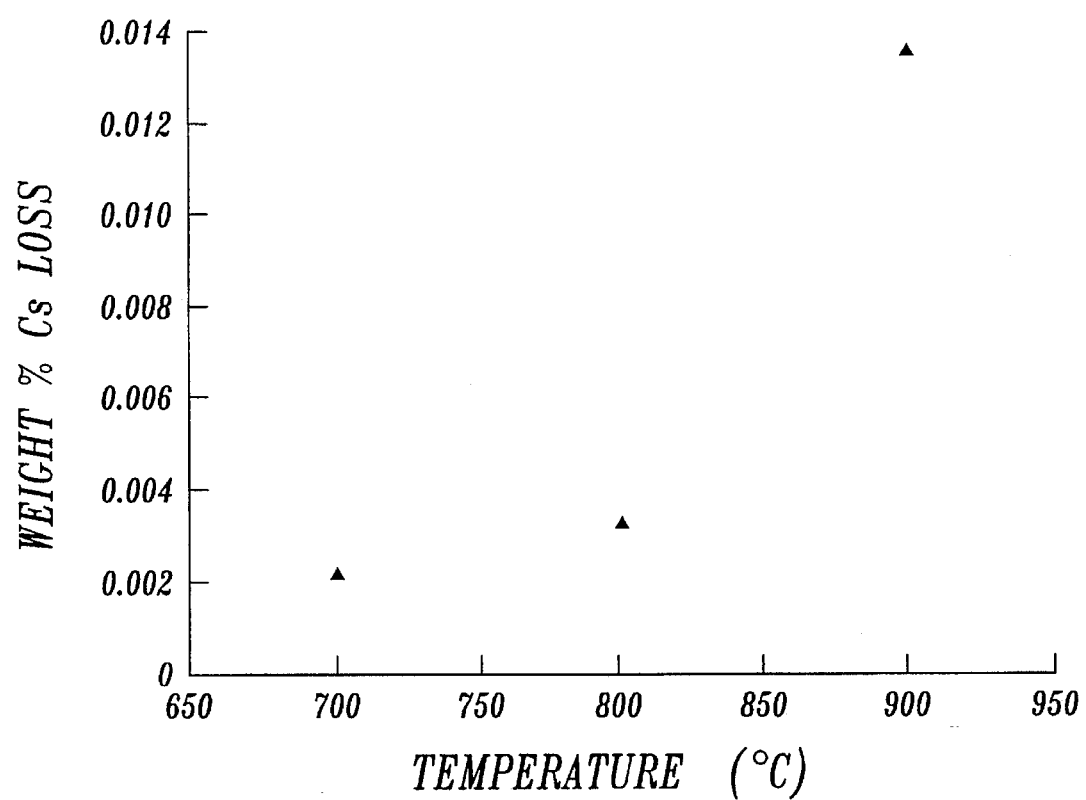
FIG. 9 is a graph of % Cs weight loss versus temperature for CsTiSi$_2$O$_{6.5}$.

The weight percent Cs lost for $Cs_2Ti_2Si_4O_{13}$ pellets as a function of heat treatment temperature is shown in FIG. 9. The losses are surprisingly extremely low at the expected processing temperatures of 700 to 800° C. (0.0022 to 0.0033 wt %). For comparison, at the nominal melting temperature of ≈1150° C. for a borosilicate glass, Cs losses can be as high as 70 wt %. as reported by W. J. Gray, "Volatility of Some Potential High-Level Radioactive Waste Forms" *Radioactive Waste Management*, Vol. 12, pp. 147–169, 1980. At 900° C. losses from borosilicate glass are approximately 0.8 wt % as compared to 0.014 wt % at 900° C. for the cesium silicotitanate pollucite as reported by the effect of surface area versus total volume of material on the Cs volatility for $Cs_2Ti_2Si_4O_{13}$ is illustrated in Table 4. Large increases in surface area for the same weight material (≈$10^5$) produced marginal increases in Cs loss ($4\times10^{-6}$ g), whereas a ten-fold increase in total weight produced a much larger increase in Cs loss ($37\times10^{-6}$ g).

TABLE 4

Cs Loss as a Function of Surface Area and Total Weight for $Cs_2Ti_2Si_4O_{13}$ Heat Treated to 900° C./1 Hour.

| Surface Area ($cm^2$) | Total Cs Weight Loss (g × $10^{-6}$) | Total Material Weight (g) |
| --- | --- | --- |
| 1.82 | 6.98 | 0.30 |
| 9.52 | 44.3 | 3.00 |
| 4.48 × $10^5$ | 10.8 | 0.30 |

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A cesium silicotitanate material, comprising;
   (a) a primary compound containing cesium,
   (b) a secondary compound containing titanium,
   (c) a tertiary compound containing silicon,
   (d) oxygen forming a ternary compound of cesium titanium silicate pollucite, wherein a proportion of $TiO_2$ is less than 43 mole percent.

2. The material as recited in claim 1, wherein the cesium titanium silicate pollucite has the chemical formula $Cs_xTi_ySi_zO_n$ wherein x and y range from 1 to 2, z ranges from 1 to 5, and n ranges from 5 to 13.

3. The material as recited in claim 2, wherein a portion of the cesium titanium silicate pollucite has a structure having the chemical formula $Cs_2Ti_2Si_4O_{13}$, or $CsTiSi_2O_{6.5}$.

4. The material as recited in claim 3, wherein the cesium titanium silicate pollucite contains an amount of $TiO_2$ greater than about 1 mole %.

5. The material as recited in claim 3, wherein the cesium titanium silicate pollucite contains an amount of $Cs_2O$ greater than or equal to about 1 mole %.

6. The material as recited in claim 1, wherein said primary compound is $Cs_2O$, said secondary compound is $TiO_2$, and said tertiary compound is $SiO_2$.

7. The material as recited in claim 6, wherein an amount of the $Cs_2O$ ranges from 1 to 30 mole %, an amount of the $TiO_2$ ranges from 1 to 42 mole %, and an amount of the $SiO_2$ ranges from 30 to 95 mole %.

8. The material as recited in claim 7, wherein the amount of $Cs_2O$ ranges from 1 to 30 mole %, the amount of $TiO_2$ ranges from 15 to 42 mole %, and the amount of $SiO_2$ ranges from 30 to 84 mole %.

9. The material as recited in claim 8, wherein the amount of $Cs_2O$ ranges from 10 to 18 mole %, the amount of $TiO_2$ ranges from 25 to 32 mole % and the amount of $SiO_2$ ranges from 54 to 60 mole %.

10. The material as recited in claim 9, wherein the amount of $Cs_2O$ is 14 mole %, the amount of $TiO_2$ is 29 mole % and the amount of $SiO_2$ is 57 mole %.

11. The material as recited in claim 6, wherein a mole ratio of $TiO_2$ to $SiO_2$ is less than or equal to 1:1, or greater than 1.05:1.

12. The material as recited in claim 6, wherein a mole ratio of $TiO_2$ to $Cs_2O$ is less than 2.5:1 or greater than 3.2:1.

13. A cesium silicotitanate material containing a cesium titanium silicate pollucite which comprises;
   (a) a primary compound containing cesium,
   (b) a secondary compound containing titanium,
   (c) a tertiary compound containing silicon, and
   (d) oxygen forming a ternary compound of said cesium titanium silicate pollucite, wherein a proportion of $TiO_2$ is less than 43 mole percent.

14. The material as recited in claim 13, wherein the cesium titanium silicate pollucite phase contains an amount of $TiO_2$ greater than about 1 mole %.

15. The material as recited in claim 13, wherein the cesium titanium silicate pollucite phase contains an amount of $Cs_2O$ greater than or equal to about 1 mole %.

16. A method of making cesium titanium silicate pollucite, comprising the steps of:
   (a) selecting amounts of oxides of cesium, silicon, and titanium,
   (b) combining the oxides, and
   (c) heat treating the combined constituents and forming the cesium titanium silicate wherein the amount of $TiO_2$ is less than 43 mole %.

17. The method as recited in claim 16, wherein the step of combining comprises the step of:
   mixing oxides of cesium oxide, silica and titania.

18. The method as recited in claim 16, wherein the step of combining comprises the steps of:
   (a) synthesizing silicon and titanium precursor materials, and
   (b) hydrolyzing the precursor materials.

19. The method as recited in claim 18, wherein the step of synthesizing comprises the steps of:
   mixing titanium and silicon alkoxides in an inert atmosphere.

20. The method as recited in claim 19, wherein the titanium and silicon alkoxides are tetraisopropyl orthotitanate (Ti[OCH(CH$_3$)$_2$]$_4$), and tetraethyl orthosilicate (Si[OC$_2$O$_5$]$_4$) respectively.

21. The method as recited in claim 19, wherein the step of hydrolyzing comprises the steps of:

(a) mixing cesium hydroxide with a solution of ethanol and water, and (b) adding the mixture dropwise to the alkoxide mixture resulting in hydrolysis and condensation reactions.

22. The method as recited in claim 19, wherein a ratio of ethanol to water is about 1:1.

23. A method of containing cesium comprising the steps of:

(a) combining a cesium compound with oxygen containing titanium and silicon compounds, (b) heating the combination to at least 700° C., and (c) forming a cesium silicotitanate pollucite having an amount of TiO$_2$ less than 43 mole %.

* * * * *

UNITED STATES PATENT AND TRADEMARK OFFICE
CERTIFICATE OF CORRECTION

PATENT NO. : 5,591,420
DATED : 01/07/97
INVENTOR(S) : Balmer

It is certified that error appears in the above-indentified patent and that said Letters Patent is hereby corrected as shown below:

Abstract   The 8th line, please replace "$Cs_2$" with --$Cs_2O$--.

Column 1, line 48 please replace "Mn Co Ni" with --Mn, Co, Ni--.

Signed and Sealed this

Second Day of September, 1997

Attest:

BRUCE LEHMAN

Attesting Officer

Commissioner of Patents and Trademarks